United States Patent [19]

Dijkman

[11] 4,368,428

[45] Jan. 11, 1983

[54] METHOD AND ARRANGEMENT FOR DETERMINING THE VELOCITY OF A VEHICLE

[75] Inventor: Marcellinus F. H. Dijkman, Hilversum, Netherlands

[73] Assignee: U.S. Philips Corporation, New York, N.Y.

[21] Appl. No.: 175,108

[22] Filed: Aug. 4, 1980

[30] Foreign Application Priority Data

Aug. 9, 1979 [NL] Netherlands .......................... 7906087

[51] Int. Cl.³ ................................................. G01P 3/66
[52] U.S. Cl. .................................... 324/178; 340/38 L
[58] Field of Search ................. 324/178, 179; 364/565, 364/438; 340/38 L, 62, 670; 235/92 TC; 246/29 R, 30, 63 A, 187 B, 249

[56] References Cited

U.S. PATENT DOCUMENTS

| | | | |
|---|---|---|---|
| 3,364,465 | 1/1968 | Prucha | 340/38 L |
| 3,373,374 | 3/1968 | Marosi | 340/38 L X |
| 3,656,059 | 4/1972 | Overstreet | 324/179 X |
| 4,234,923 | 11/1980 | Eshraghian et al. | 340/38 L X |

FOREIGN PATENT DOCUMENTS

| | | | |
|---|---|---|---|
| 1521088 | 3/1968 | France | 324/178 |
| 1066475 | 4/1967 | United Kingdom | 340/38 L |

*Primary Examiner*—Stanley T. Krawczewicz
*Attorney, Agent, or Firm*—Robert T. Mayer; Bernard Franzblau

[57] ABSTRACT

A vehicle detection system including a pair of inductive loops arranged in the road surface for measuring the speed of passing vehicles. Each loop is the frequency determining element of an oscillator of first and second vehicle detectors. A first measuring value is derived by each detector for a first predetermined measuring time interval in which the measuring value exceeds a response threshold and a second measuring value is derived for a predetermined second measuring time interval shifted a predetermined period of time relative to the first measuring time interval, the second measuring value being below the response threshold. The instant at which each of the detectors is activated is determined by interpolation between the first and second measuring values.

8 Claims, 5 Drawing Figures

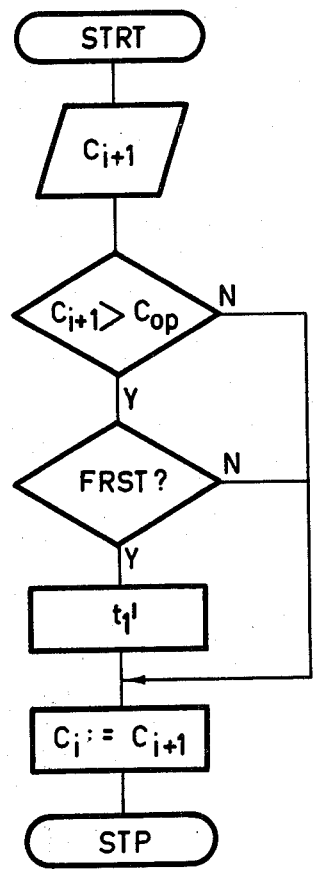
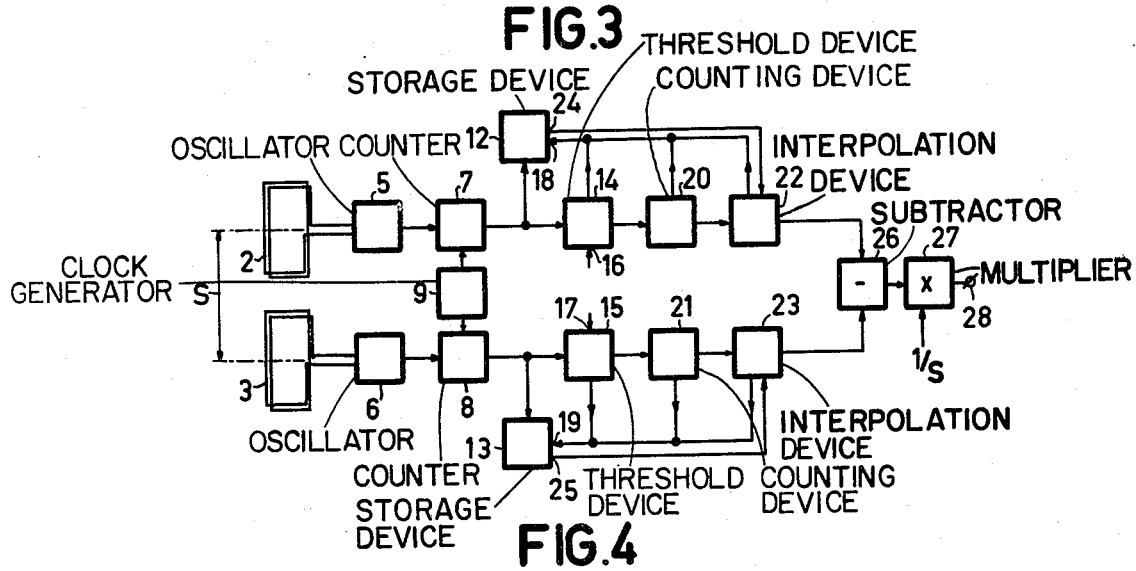
FIG.3
FIG.4

METHOD AND ARRANGEMENT FOR DETERMINING THE VELOCITY OF A VEHICLE

This invention relates to a method of determining the velocity of a vehicle, in which a first and a second vehicle presence detector are arranged at a predetermined distance from one another in the travelling direction of the vehicle.

The invention further relates to an arrangement for putting the method into effect.

Such a method and arrangement are disclosed in German Patent Application 2,537,657, which has been laid open to public inspection. In such a method, after detection of the presence of a vehicle. The first detector applies a pulse signal with a predetermined pulse frequency to a pulse counter, the pulse supply being stopped when the second detector detects the presence of the vehicle. The presence of the vehicle is determined by measuring a quantity which is a measure of the presence of the vehicle. If the value of this quantity exceeds a predetermined threshold or falls below the predetermined threshold then the instant at which this occurs is the instant at which the pulse counter is started or stopped. A problem then occurring is the inaccuracy with which the presence detector can determine the starting and stopping instants of the pulse counter.

The invention has for an object to provide a method of determining the velocity of a vehicle of the type mentioned in the opening paragraph with which, in spite of the use of presence detectors which are relatively inaccurate for velocity determination, the velocity of a vehicle is determined accurately and efficiently. According to the invention this is effected in that each detector produces a measuring value which varies in dependence on the position of the vehicle relative to the detector, that, when a vehicle passes, each detector determines:

a first measuring value measured over a first measuring time interval in which the measuring value exceeds a response threshold;

a second measuring value measured over a second measuring time interval in which the measuring value is below the response threshold, this second measuring time interval occurring a predetermined period of time after the first measuring time interval;

and that:

the instant in a time interval at which each detector is activated is determined by interpolation; and the velocity of the vehicle is determined from the predetermined distance between the two detectors and the difference between the two instants determined in the preceding step.

An embodiment of an arrangement for putting the method into effect is characterized in that each vehicle presence detector comprises an inductive loop which forms part of an oscillator circuit whose oscillation frequency is dependent on the position of the vehicle relative to the loop, that each oscillator circuit is coupled to a counter for determining a measuring value which corresponds to the number of periods of the oscillation frequency during one of the measuring time intervals generated by a clock device which is connected to the two oscillator circuits, that each of the counters is connected to a first input of a respective storage device for storing the measuring value of the respective counter and is further connected successively to a threshold device, a counting device and an interpolation device, that an output of each of the threshold devices, counting devices and interpolation devices is connected to a second input of the storage device, that an output of each of the storage devices is connected to one of the interpolation devices, that an output of each interpolation device is connected to a difference device for the determination of the time difference between the instant the response threshold of the first and of the second loop is exceeded and that an output of the difference device and a signal determined by the distance between the two loops are applied to a multiplier which produces an output signal which represents the velocity of the passed vehicle.

It should here be noted that U.S. Pat. No. 3,989,932 discloses a vehicle presence detector which comprises an inductive loop to which a capacitor is connected in parallel. The parallel circuit is the frequency-determining element of an oscillator circuit. The frequency of the oscillator, which varies in dependence on the quantity of metal in the field of the loop, is measured by measuring the number of periods of the oscillator by means of a counter during predetermined time intervals. Neither the use of two of such vehicle detectors for the determination of the velocity nor the interpolation measures to achieve a high degree of accuracy according to the present invention are described in this German patent specification.

The invention will be further explained with reference to the accompanying drawings in which corresponding elements have been given the same reference symbols. In these drawings:

FIG. 2b is a detail of the diagram of FIG. 2a;

FIG. 3 is a flow diagram of a portion of an embodiment of the method for the accurate determination of the instant at which the response threshold of the detector is reached according to the invention, and FIG. 4 shows an embodiment of an arrangement for putting the method according to the invention into effect.

Figure 1:
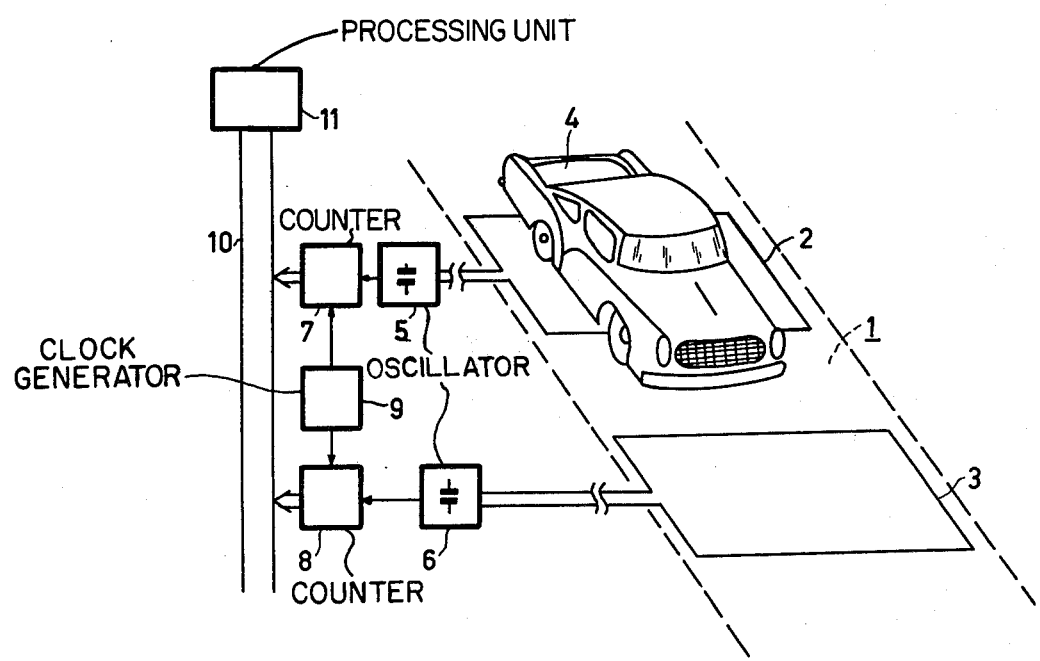
FIG. 1 shows a partly perspective view with reference to which the method of determining the velocity of a vehicle according to the invention will be explained.

FIG. 1 shows a traffic lane 1 in which a first inductive loop 2 and a second inductive loop 3 are arranged in the travelling direction of the vehicles. The loops 2 and 3 have, for example, the rectangular shape shown in the drawing, have a size of 1.80 by 1.50 m and are arranged at a centre-to-centre distance of 2.50 m from one another. The loops 2 and 3 may comprise one or several turns. The turns are located in slotted recesses in the road surface of lane 1. After the turns have been positioned the slots are filled with, for example, a resin. Each of the inductive loops 2 and 3 forms a parallel resonant circuit in conjunction with a fixed tuning capacitor connected in parallel therewith. This resonant circuit is the frequency determining element of an oscillator circuit 5 and 6, respectively, which is connected to the loop 2 and 3, respectively. The oscillation frequency of the oscillator circuits 5 and 6 is affected when a vehicle 4 passes over the loop because the inductance of the loop changes in response to the quantity of metal in the field of the loop. If it is assumed that $f_{res}$ is the resonant frequency of the parallel circuit, L the inductance and C the value of the fixed tuning capacitor, then it holds at resonance:

$$2\pi f_{res} = 1/\sqrt{LC}.$$

The relative frequency variation, $\Delta f/f$, then is:

$$\Delta f/f = -\tfrac{1}{2}(\Delta L/L).$$

The oscillator frequency is measured by counting, during a given measuring time interval $t_m$, in a digital counter 7 and 8 the number of periods of the oscillation frequency applied to the counters 7 and 8 by oscillator circuits 5 and 6. The measuring time interval $t_m$ is derived from a clock 9 which is connected to the two counters 7 and 8. The clock 9 comprises, for example, a crystal controlled oscillator from which time intervals of the desired duration ($t_m$) are generated by means of a divider. The duration of the measuring time interval $t_m$ should be short compared with the period of time the vehicle remains in the field of the loop in order to achieve a resolution of a sufficiently high degree (a vehicle of length of 4 m which passes a loop having a length of 2 m in the travelling direction at a speed of 144 km/hour is in the field of the loop for approximately 150 m.sec). On the other hand the duration of the measuring time interval should be long enough to ascertain the counting result with a sufficient degree of accuracy. In addition, a long measured period reduces the interference with neighbouring loops. A value of approximately 12 m.sec. appears to be very satisfactory in practice.

The counting position of the counters 7 and 8 at the end of the measuring time interval is the measuring value. These measuring values are applied to a processing unit 11 via a databus 10. Processing unit 11 is, for example, a microprocessor. The processing unit 11 determines the velocity of the passing vehicle in a manner to be described hereinafter.

Figure 2A:
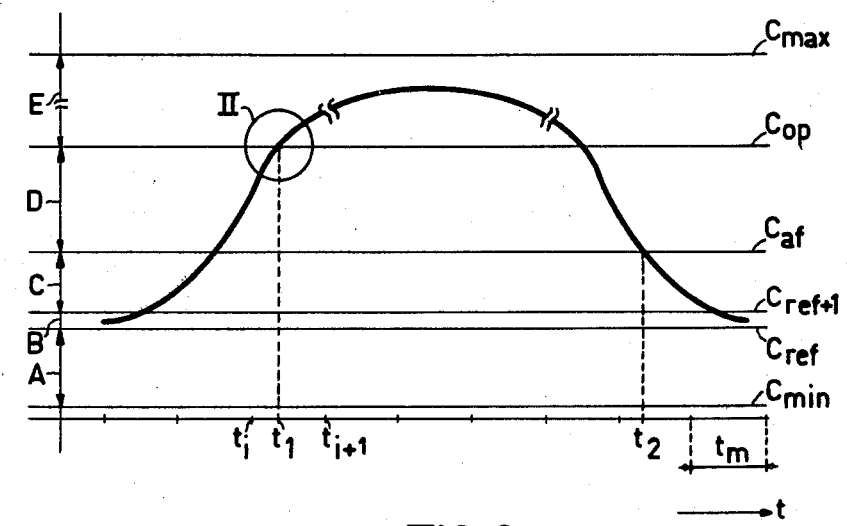
FIG. 2a is a diagram to illustrate the frequency disturbance of an inductive loop when a vehicle passes.

The diagram of FIG. 2a shows the variation of the measuring value C when a vehicle passes one loop. The time, subdivided into mutually equal measuring time intervals $t_m$, is plotted on the abscissa. The ordinate is subdivided into a number of areas, to be explained, denoted by A to F inclusive.

When no vehicle is present, the oscillation frequency will have a predetermined nominal value. In FIG. 2a the measuring value corresponding therewith is denoted by $C_{ref}$. When the vehicle enters the loop, the measuring value C increases, reaches a maximum value and decreases again when the vehicle leaves the loop. If the measuring value C exceeds a predetermined value—a response threshold $C_{op}$—the detector is considered to be "busy". The response threshold $C_{op}$ has been chosen relatively high to obtain adequate protection from interference, for example, from neighbouring loops. When the measuring value C decreases to below $C_{af}$, the detector is released and is ready for activation by the next vehicle. The response threshold $C_{af}$ has been chosen relatively low to prevent the detector from being released when the coupling between a truck and trailer passes across the loop. Consequently, the detector must be considered as being "busy" between the instants denoted in FIG. 2a by $t_1$ and $t_2$.

By way of protection from inter alia short circuiting or interruption of the inductive loop, a measuring value C is only accepted as a permissible value when it is located between a given maximum value $C_{max}$ (short-circuit in the loop; the oscillator frequency is very high) and a certain minimum value $C_{min}$ (the loop is interrupted: the oscillator frequency is very low).

If the loop is not activated by a vehicle the measuring value recorded on the counter for each time interval will be equal to $C_{ref}$, that is to say the measuring value will be between $C_{ref}$ and $C_{ref}+1$, i.e. an area denoted by B in FIG. 2a. To be able to compensate for weather and other influences which may cause the loop and the detector to drift the reference value can be changed. This is done as follows. If the average measuring value of a large number of measurements has increased and is therefore located in the area C ($C_{ref+1}<C<C_{af}$) then $C_{ref}$ is increased by one to $C_{ref}+1$. If, on the contrary, the average measuring value of a large number of measurements has decreased, then $C_{ref}$ is decreased by one to $C_{ref-1}$. Measuring values located in the area D ($C_{af}<C<C_{op}$) and E($C_{op}<C<C_{max}$) will not be considered during the determination of the average measuring value.

Figure 2B:
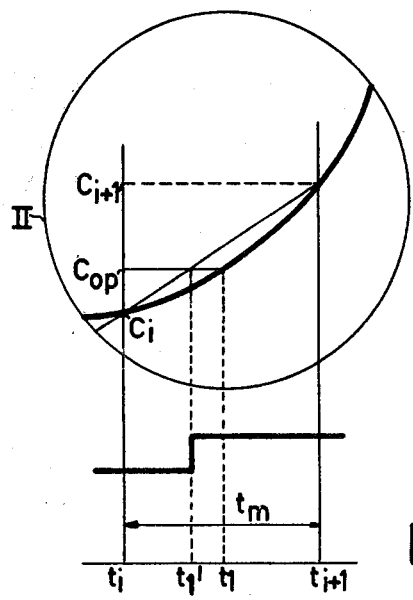

As described above, the counters 7 and 8 (FIG. 1) determine measuring values C uninterruptedly during the measuring time intervals $t_m$. If in the measuring time interval ending at the instant $t_{i+1}$ (FIG. 2) it appears that at that instant the measuring value has exceeded the response threshold value, this is a certain indication that a vehicle has entered the loop. The problem then encountered, however, is that it is only ascertained that the vehicle has entered the loop during that measuring time interval. The instant $t_1$ (FIG. 2a) at which this occurred can therefore only be determined with an accuracy which is given by the duration of the measuring time interval $t_m$. This restricts the accuracy with which the velocity of the vehicle—given by the distance between the loops divided by the time elapsed between the instants at which the first and the second loop are activated—can be computed. The accuracy of the velocity measurement of the vehicle is materially increased by the determination, according to the invention, of the instant at which the vehicle enters the loop (defined by the instant at which the response threshold $C_{op}$ is reached) by interpolating a measuring value at an instant at which the measuring value has exceeded the minimum operating current in the immediately preceding measuring time interval and a measuring value at an instant at which this is not the case. FIG. 2b is an enlarged representation, given by way of further explanation, of a portion II of the diagram of FIG. 2a, namely the portion around $t=t_1$. At instant $t=t_{i+1}$ the measuring value is $C_{i+1}$, wherein $C_{i+1}<C_{op}$. At the end of the preceding measuring time interval, namely at instant $t=t_i$ a measuring value $C_i$ ($C_i<C_{op}$) was determined and stored. By, for example, linear interpolation between the measuring values $C_{i+1}$ and $C_i$ an instant $t_1'$ is determined in accordance with:

$$t_1' = [(C_{op}-C_i)/(C_{i+1}-C_i)]t_m$$

In a corresponding manner an instant $t_3'$ (not shown) is determined at which the second loop is activated. The velocity V of the vehicle is determined for a distance S between the first and the second loops in accordance with:

$$V = S/(t_3'-t_1')$$

The instants $t_1'$ and $t_3'$ are instants which, in the case of linear interpolation, correspond approximately with the exact instants $t_1$ and $t_3$ defined by the points where the response threshold $C_{op}$ intersects the curve of FIG. 2a. It was, however, found that for the detector used the slope of the curve shown in FIG. 2a is substantially linear in the area around $C_{op}$. Should the detector curve vary differently, for example if it has a quadratic variation, then the interpolation method may be adapted thereto by using quadratic interpolation and the instant $t_1'$ determined in this manner may be considered a very close approximation of instant $t_1$.

In the manner described above the velocity of a passing vehicle is measured in a simple manner and with a high degree of accuracy in spite of the use of vehicle presence detectors which are otherwise relatively inaccurate for velocity measurement.

A further detail of an embodiment of the method for determining the velocity is illustrated in the flow diagram of FIG. 3.

The legends of the geometric figures which explain the functions and the states of the method for the determination of the velocity in time sequence are explained herebelow. It should be noted that such a time sequence of functions and associated states of the method can be realised in universal sequential logic circuits such as commercially available microprocessors with associated stores and peripheral equipment.

| Legend | Description |
| --- | --- |
| (1)- STRT | Start |
| (2) $C_{i+1}$ | the new, most recent, measuring value $C_{i+1}$ is presented; |
| (3) $C_{i+1} > C_{op}$ | the new measuring value $C_{i+1}$ is compared with the predetermined response threshold $C_{op}$; if $C_{i+1}$ is lower than $C_{op}$(No) proceed to step (6); if $C_{i+1}$ is higher than $C_{op}$ (Yes) proceed to the next step (4). |
| (4) FRST | check whether the preceding measuring value $C_i$ also exceeds the response threshold $C_{op}$; if so (No) proceed to step (6); if not (yes) the next step (5) is performed; |
| (5) $t'_1$ | the instant $t'_1$ is determined in accordance with the formula: $t'_1 = [(C_{op}-C_i)/(C_{i+1}-C_i)]t_m$; instant $t'_1$ thus found is stored in a memory |
| (6) $C_i = C_{i+1}$ | the preceding measuring value $C_i$ is replaced by the new measuring value $C_{i+1}$. |
| (7) STP | Stop. |

The universal sequential logic circuits, with which the functions and states as shown in FIG. 3 are performed, are part of the processing unit 11 which receives the counting values of the counters 7 and 8 and the relevant time intervals via the address bus 10. After the instants $t_1'$ and $t_3'$ have been determined in the above-described manner, the velocity of the vehicle is determined from the distance between the two loops and the time difference $(t_3'-t_1')$.

It should be noted that, instead of performing an interpolation around the instant at which the vehicle enters the loop $(t_1)$, an interpolation around the instant at which the vehicle has passed the loop $(t_2$ FIG. 2a) is alternatively possible. Interpolation between an instant at which the first loop is no longer occupied $(C<C_{af})$ and an instant at which this was still the case, results in an instant $t_2'$ and interpolation between the instant at which the second loop is no longer occupied $(C<C_{af})$ and an instant at which this was still the case results in an instant $t_4'$. The velocity can be determined from $t_2'$ and $t_4'$ in the manner already described.

An embodiment of an arrangement for putting the method into effect is shown in FIG. 4. The first loop 2 is connected to oscillator circuit 5, the second loop 3 at a centre-to-centre distance S from the first loop is connected to oscillator circuit 6. The digital counter 7 (8) which is connected to an output of oscillator circuit 5 (6) counts the number of periods of the oscillator frequency in a given time interval. To that end each of the counters 7 and 8 is connected to a clock 9 comprising, for example, a crystal-controlled oscillator and one or more divider circuits. The clock 9 applies pulses at predetermined instants, consecutive instants being at a time interval $t_m$ from one another, to counters 7 and 8, causing the counters to be stopped. The counting values reached are applied to respective storage devices 12 and 13 and to threshold devices 14 and 15, respectively, connected to the output of the counters 7 and 8, respectively. The counters are then reset. The measuring values, i.e. the counting values supplied by the counters, are compared by the threshold device 14 (15) with a predetermined threshold value applied to a threshold input 16 (17). Each of the storage devices 12 and 13 comprises two addresses and two storage locations. The storage location corresponding to the first address contains the new (most recent) measuring value together with the number of the measuring time interval to which it relates, and the storage location corresponding to the second address contains the preceding measuring value together with the number of the measuring time interval to which it relates. If the new, most recent measuring value has a value lower than the threshold value, the threshold device 14 (15) applies a signal to input 18 (19) of its respective storage device which causes the content of the first address to be transferred to the second address. The information already present in the second address (the prior measuring value) is replaced by the new information (the new, most recent measuring value). If, on the contrary, the new, most recent measuring value has a value higher than the threshold value, the measuring value is applied to a counting device 20 (or 21) which determines whether this measuring value is the first measuring value which has exceeded the response threshold. If this is not the case, that is to say the response threshold has already been exceeded one or more times in this measuring cycle, counting device 20 (or 21) applies a signal to input 18 (or 19) of the storage device 12 (or 13). This signal effects the same operation as the above-described signal obtained from the threshold device 14 (or 15). If, on the contrary, the measuring value exceeds the response threshold for the first time, the measuring value is applied to an interpolation device 22 (or 23). Each of the interpolation devices 22 and 23 comprises, for example, an interpolation table stored in an xy-addressable store. The x-value is the new measuring value supplied by the counting device 20 (or 21) and the y-value is the prior measuring value stored in the storage device 12 (or 13) in the second address. This prior measuring value is applied to the interpolation device 22 (or 23) via an output 24 (or 25) of storage device 12 (or 13). The interpolation values $t_1'$ and $t_3'$ determined in this way by these two measuring values is applied to a difference device 26 and a signal which effects the same operation as a signal coming from the threshold device 14 (or 15) or counting device 20 (or 21) is applied to input 18 (or 19) of storage device 12 (or 13). The output signal $(t_3'-t_1')$ of the difference device 26 is applied to a first input of a multiplying device 27. A second input of multiplying device 27 is supplied with a predetermined value which is equal to the reciprocal value of the distance S between the two loops. A signal which represents the velocity of the vehicle (which is in the present case the reciprocal value of the velocity) is then available at an output 28 of the multiplying device 27.

It should be noted that a pair of coupled coils or a F.M. antenna may, for example, be used instead of an inductive loop 2 or 3. When coupled coils are used the presence of a vehicle affects the coefficient of coupling and when an F.M. antenna is used the aerial is shielded from an F.M. transmitter by the vehicle.

What is claimed is:

1. A method of determining the velocity of a vehicle by means of a vehicle detection system including first and second vehicle presence detectors arranged at a predetermined distance from one another in the travelling direction of the vehicle wherein each detector produces a measuring value which varies in dependence on the position of the vehicle relative to the detector, the method comprising, for each detector when a vehicle passes determining a first measuring value measured over a first measuring time interval in which the measuring value exceeds a response threshold;

determining a second measuring value measured over a second measuring time interval in which the measuring value is below the response threshold, the second measuring time interval having been shifted a predetermined period of time relative to the first measuring time interval;

determining by interpolation the instant in a measuring time interval at which each detector is activated; and computing the velocity of the vehicle using the predetermined distance between the two detectors and the time difference determined between the two instants in the interpolation step.

2. A method as claimed in claim 1 including storing the measuring value measured in a measuring time interval for at least one measuring time interval.

3. A method as claimed in claim 1, characterized in that the interpolation is linear.

4. A vehicle detection system comprising first and second inductive loops spaced apart a given distance in the direction of vehicle travel, first and second vehicle presence detectors coupled to said first and second inductive loops, respectively, each vehicle presence detector comprising an oscillator circuit including its respective inductive loop wherein the oscillator oscillation frequency is dependent on the position of the vehicle relative to the inductive loop, a clock connected to at least one said oscillator circuit for generating signals defining a sequence of measuring time intervals, means coupling each oscillator circuit to a respective counter for the determination of a measuring value which corresponds to the number of periods of the oscillation frequency during one of the measuring time intervals generated by said clock, means connecting each counter to a first input of a respective storage device for storing the measuring value of the associated counter, means connecting each counter to a cascade connection of a threshold device, a counting device and an interpolation device, means coupling an output at each of the threshold devices, counting devices and interpolation devices to a second input of its respective storage device, means connecting an output of each of the storage devices to respective ones of the interpolation devices, a difference device, means connecting an output of each of the interpolation devices to said difference device to determine the time difference between the instants at which the response thresholds of the first and the second loops are exceeded, means for applying an output of the difference device and a signal determined by said given distance between the first and second inductive loops to a multiplier which derives an output signal which represents the velocity of a passing vehicle.

5. In a vehicle detection system including first and second means for sensing a passing vehicle and spaced apart a given distance in the direction of vehicle travel, the improvement comprising first and second vehicle presence detectors adapted for operation by said first and second sensing means, respectively, and having first and second oscillator circuits, respectively, whose oscillation frequencies are caused to change by a passing vehicle to derive first and second oscillation signals, respectively, means for generating a sequence of control signals that produce a sequence of equal measuring time intervals, means in each of the first and second detectors responsive to the respective first and second oscillation signals and controlled by said signal generating means for deriving first and second measuring signals in successive measuring time intervals, each detector including means for comparing the first and second measuring signals with a reference threshold level to determine the first measuring time interval in which a measuring signal exceeds the reference threshold level, each said detector further including means controlled by said comparing means for interpolating between said first and second measuring signals to derive a third signal that indicates the exact instant within said first measuring time interval that the measuring signal exceeded the reference threshold level, and processing means responsive to the third signal of each detector and to a signal indicative of said given distance between the first and second sensing means for producing an output signal that represents the velocity of a passing vehicle.

6. A vehicle detection system as claimed in claim 5, wherein the control signal generating means includes a clock generator and the means in each detector for deriving a measuring signal comprises a counter whose counting interval is controlled by the clock generator so that in each measuring time interval the counter produces a count determined by the oscillation frequency of its respective oscillator circuit and which is indicative of said first or second measuring signal, said system further comprising a storage device in each detector having first and second storage areas and coupled to its respective counter and its respective comparing means for storing the counts of two successive measuring time intervals.

7. A vehicle detection system as claimed in claims 5 or 6, wherein the processing means includes in cascade a subtraction device and an arithmetic device that derives a velocity output signal in accordance with the formula, $V = S/(t_3' - t_1')$ where V is the vehicle velocity, S is the given distance between the first and second sensing means and $t_3'$ and $t_1'$ are the instants in time represented by the third signal derived in said first and second vehicle presence detectors, respectively.

8. In a vehicle detection system including first and second means for sensing the presence of a passing vehicle and spaced apart a given distance in the direction a vehicle travels and first and second vehicles presence detectors controlled by said first and second sensing means to produce first and second measuring value signals which vary as a function of the vehicle position relative to the respective sensing means, the method of determining vehicle velocity comprising, for each detector, deriving a sequence of equal measuring time intervals, determining two successive measuring time intervals in which measuring value signals are derived that are above and below a given threshold value, respectively, upon determination that two successive measuring time intervals produce measuring value signals above and below said given threshold value, deriving by interpolation a third signal indicative of the instant within a measuring time interval that a measuring value signal equals the given threshold value, and computing the vehicle velocity using as parameters a signal determined by the given distance between the first and second sensing means and the time difference between the third signals derived in each of said detectors.

* * * * *

UNITED STATES PATENT AND TRADEMARK OFFICE
CERTIFICATE OF CORRECTION

PATENT NO. : 4,368,428

DATED : January 11, 1983

INVENTOR(S) : MARCELLINUS F.H. DIJKMAN

It is certified that error appears in the above-identified patent and that said Letters Patent is hereby corrected as shown below:

In Column 1, line 15, after "vehicle" change "." (period) to --,-- (comma) and change "The" to --the--

In the Claims:

Claim 4, line 21, change "at" to --of--

Signed and Sealed this

Ninth Day of October 1984

[SEAL]

Attest:

Attesting Officer

GERALD J. MOSSINGHOFF

Commissioner of Patents and Trademarks